UNITED STATES PATENT OFFICE.

EMIL LABHARDT, OF HOTTINGEN, ZURICH, SWITZERLAND, ASSIGNOR TO AKTIENGESELLSCHAFT FARBWERKE, VORMALS MEISTER, LUCIUS & BRÜNING, OF HÖCHST-ON-THE-MAIN, GERMANY.

COLORING-MATTER FROM TETRANITRO-NAPHTHOL.

SPECIFICATION forming part of Letters Patent No. 244,757, dated July 26, 1881.

Application filed January 8, 1881. (Specimens.)

*To all whom it may concern:*

Be it known that I, EMIL LABHARDT, a citizen of Switzerland, residing at Hottingen, in the Canton of Zurich and Republic of Switzerland, have invented certain new and useful Improvements in a Coloring-Matter and the Process of Manufacturing it; and I do hereby declare the following to be a full, clear, and exact description of the invention, such as will enable others skilled in the art to which it appertains to make and use the same.

My invention has for its object the production of a yellow or orange coloring-matter, prominent by its brilliancy and fastness, also by its easy application on silk and wool principally.

It is well known that the halogen atoms are strongly joined in the halogen derivatives of the aromatic hydrocarbons. They however become movable by the introduction of nitro-groups. Thus my method is founded upon producing the tetranitro compounds from monobromnaphthaline (or monochlornaphthaline) by energetic nitrification. In the tetranitro compound $C^{10}H^3(NO^2)_4Br$, the halogen atom can be easily substituted by various molecular rests, (hydroxyl, amid, phenylamid, &c.,) and thereby are formed well crystallizing derivatives, among which I have recognized till now as a valuable coloring-matter the body that is obtained after the method described hereinafter. For example, I add carefully three parts of monobromnaphthaline to twelve parts of fuming nitric acid, and after the action has gone on for a longer space of time I dilute the reaction product with much water, and wash the nitro products that have separated sufficiently with water. It is advantageous to wash the so obtained bodies with naphtha, benzole, alcohol, or similar liquids to remove any by-products. The thus obtained dinitro derivative of the bromnaphthaline is added to the octuple quantity of a mixture of equal parts of sulphuric acid (specific gravity 1.842) and fuming nitric acid and heated for some time. Then the whole is poured into water, the precipitate washed, and freed from water as much as possible. In this way I obtain a mixture of isomeric tetranitro-bromnaphthalines, among which the one suiting my purpose is prominent by its greater solubility in various mediums, such as acetic acid, benzole, acetic ethyl-ether, acetone, &c., and is easily separable. The soluble tetranitro-monobromnaphthaline thus obtained is digested with a warm solution of soda, whereby is formed the soda-salt of the tetranitro-naphthol, which is purified by crystallizing, and which represents the coloring-matter that I call "heliochrysine." For last reaction I give the formula: $C^{10}H^3(NO^2)_4Br + Na^2CO^3 = C^{10}H^3(NO^2)_4ONa + NaBr + CO^2$.

What I claim as new, and desire to secure by Letters Patent of the United States, is—

As a new article of manufacture, the yellow coloring-matter, being a sodium salt of tetranitron-naphthol obtained by the energetic nitrification of monobromnaphthaline, as herein described, or by any other method which will produce a like result, and possessing the qualities as herein set forth.

In testimony whereof I affix my signature in presence of two witnesses.

EMIL LABHARDT.

Witnesses:
JULIUS FRESE,
FREDERICK VETTER.